(12) United States Patent
Leverett

(10) Patent No.: US 7,519,628 B1
(45) Date of Patent: Apr. 14, 2009

(54) TECHNIQUE FOR ACCELERATING LOG REPLAY WITH PARTIAL CACHE FLUSH

(75) Inventor: Bruce W. Leverett, Pittsburgh, PA (US)

(73) Assignee: Network Appliance, Inc., Sunnyvale, CA (US)

( * ) Notice: Subject to any disclaimer, the term of this patent is extended or adjusted under 35 U.S.C. 154(b) by 369 days.

(21) Appl. No.: 10/858,169

(22) Filed: Jun. 1, 2004

(51) Int. Cl.
 *G06F 17/30* (2006.01)
(52) U.S. Cl. .................. 707/202; 707/100; 707/205; 714/15; 714/20
(58) Field of Classification Search ............. 707/100, 707/202, 205; 714/15, 20
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |
| 4,989,206 A | 1/1991 | Dunphy, Jr. et al. | |
| 5,124,987 A | 6/1992 | Milligan et al. | |
| RE34,100 E | 10/1992 | Hartness | |
| 5,155,835 A | 10/1992 | Belsan | |
| 5,426,747 A | 6/1995 | Weinreb et al. | |
| 5,524,205 A * | 6/1996 | Lomet et al. ............... 714/16 | |
| 5,581,724 A | 12/1996 | Belsan et al. | |
| 5,778,431 A * | 7/1998 | Rahman et al. ........... 711/135 |
| 5,907,848 A * | 5/1999 | Zaiken et al. ............ 707/202 |
| 6,014,674 A * | 1/2000 | McCargar ................ 707/202 |
| 6,078,999 A * | 6/2000 | Raju et al. ............... 711/161 |
| 6,266,785 B1 * | 7/2001 | McDowell ................ 714/11 |
| 6,442,508 B1 * | 8/2002 | Liao et al. ............... 702/186 |
| 6,636,879 B1 | 10/2003 | Doucette et al. | |
| 6,732,293 B1 * | 5/2004 | Schneider ................ 714/15 |

(Continued)

FOREIGN PATENT DOCUMENTS

WO WO 89/10594 11/1989

OTHER PUBLICATIONS

Administration Guide found at http://www.openafs.org/pages/doc/AdminGuide/auagd010.htm, visited on Mar. 2, 2005.

(Continued)

*Primary Examiner*—John E Breene
*Assistant Examiner*—Phong Nguyen
(74) *Attorney, Agent, or Firm*—Cesari and McKenna, LLP

(57) ABSTRACT

A system and method for replaying a log file without performing a total cache flush. The log replay is performed in three phases, a pre-processing phase that determines which portions of the log file are to be replayed, a redo phase where certain transactions are redone and an undo phase where certain transactions are rolled back. After performing the log replay only the data dirtied during the undo phase is flushed from the cache, thereby decreasing the amount of time required for the log replay operation.

40 Claims, 11 Drawing Sheets

U.S. PATENT DOCUMENTS

| | | | | |
|---|---|---|---|---|
| 6,856,993 | B1* | 2/2005 | Verma et al. | 707/101 |
| 7,062,675 | B1* | 6/2006 | Kemeny et al. | 714/15 |
| 2002/0116593 | A1 | 8/2002 | Kazar et al. | |
| 2003/0088814 | A1* | 5/2003 | Campbell et al. | 714/54 |
| 2003/0208500 | A1* | 11/2003 | Daynes et al. | 707/100 |
| 2004/0168031 | A1* | 8/2004 | Haskins | 711/136 |

OTHER PUBLICATIONS

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14th VLDB Conference, LA, CA (1988).

Blasgen, M.W. et al., *System R:An architectural Overview*,Reprinted from IBM Systems Journal vol. 20, No. 1, 1981 © 1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, In Proceedings of the USENIX Winter 1992.

Clark, B.E., et al., *Application System /400 Performance Characteristics*, IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?.

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Howard, John H., *An Overview of the Andrew File System*, Carnegie Mellon University, CMU-ITC-88-062.

*The IBM System/38*, Chapter 8, pp. 137-15.

Isomaki, Markus, *Differentiated Service for the Internet*, Deparment of Technical Physics and Mathematics, May 9, 1998.

Kazar, Michael L., et al., *Decorum File System Architectural Overview*, USENIX Summer Conference, Anaheim, California, 1990.

Lomet, David., et al., *The performance of a multiversion access method*, ACM SIGMOD International Conference on Management of Data, 19:353-363.

Lorie, Raymond, A, *Physical integrity in a large segmented database*, ACM Trans. Database Systems, (2)1:91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12th IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structure File System Design*, In Proceedings of the 13th ACM Symposium on Operating Systems Principles, Oct. 1991, pp. 56-67.

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective On The Sprite Network Operating System*, found at http://www.cs.berkeley.edu/projects/sprite/retrospective.html.visited on Mar. 11, 2005.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al, The *Design and Implementation of a Log-Structured File System* Jul. 24, 1991 pp. 1-15.

Rosenblum, Mendel, et al., *The Design and Implementation of a Log-Structured File System.* , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanayanan,.M.. *A survey of distributed file-systems*. Annual Review of Computing Science, 4(73-104), 1989.

Satyanarayanan, M., et al, *Coda: A highly available file system for a distributed workstation environment* Carnegie Mellon University, CMU-ITC.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *LADDIS: The next generation in NFS file server benchmarking*, USENIX Association Conference Proceedings, Apr. 1993.

* cited by examiner

TECHNIQUE FOR ACCELERATING LOG REPLAY WITH PARTIAL CACHE FLUSH

FIELD OF THE INVENTION

The present invention is directed to logging file systems and, in particular to accelerating the replay of a file system log.

BACKGROUND OF THE INVENTION

A storage system is a computer that provides storage service relating to the organization of information on storage devices, such as disks. The storage system may be deployed within a network attached storage (NAS) environment and, as such, may be embodied as a file server. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a computer network, such as a point-to-point link, shared local area network (LAN), wide area network (WAN), or virtual private network (VPN) implemented over a public network such as the Internet. Each client may request the services of the file system on the filer by issuing file system protocol messages to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the SpinFS file system available from Network Appliance, Inc. of Sunnyvale, Calif. The SpinFS file system utilizes a write anywhere technique for user and directory data but writes metadata in place. The SpinFS file system is implemented within a storage operating system having a protocol stack and associated disk storage.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. As described herein, a volume typically comprises at least one data disk and one associated parity disk (or possibly data/parity) partitions in a single disk) arranged according to a RAID 4, or equivalent high-reliability, implementation.

A common implementation of a write anywhere file system utilizes a file system log for improved system reliability. Each file system operation (e.g., a write operation) is a transaction that is logged (recorded) in the file system log. The log is a file that is used to provide a consistent file system after a storage system crash and recovery sequence. The log comprises a sequence of records, each of which describes a change to the file system. A transaction comprises a collection of records. In order to describe a change to the file system, the record includes both old and new values of a data item. Thus, transactions recorded in the log file include sufficient information needed to "redo" (finish) a transaction or "undo" (roll-back) the transaction.

For example, assume a file system operation is issued to delete a file from the file system. Deletion of a file generally comprises (i) modifying the directory under which the file was stored to remove the file from the directory and (ii) modifying the inode of the file to indicate that it is no longer in use. Each of these modifying actions is part of a transaction that appears in the log as a record, i.e., a sequence of bytes indicating the progress of the action. Both to the modifying actions of the transaction must be performed in order to ensure a consistent file system after a crash and recovery sequence. If only part of the transaction completes (e.g., removal of the file from the directory), then an "orphan" file is created, which may prove problematic.

Thus, if a crash to the storage system occurs during execution of a file system operation, then (during recovery) either the entire operation defining the transaction is undone or the operation is redone. To that end, a log replay system of the storage system replays the log from its beginning, identifying which transactions have been "committed," i.e., those transactions in which all records relating thereto have been written to the log. Each log record includes a transaction identifier that permits the log replay system to identify which records are related to a particular transaction and, in particular, to identify those transactions that have been committed.

Those transactions that have been committed are replayed. In this context, replay denotes (i) reading records from the log, (ii) retrieving data (to be changed) from disk, (iii) modifying those data using a "new" value from the log, and (iv) storing the modified data back to disk. Those transactions that have not been committed are undone. In this context, undoing denotes (i) reading records from the log, (ii) retrieving data (to be changed) from disk, (iii) modifying those data using a stored "old" value from the log, and (iv) storing the modified data back to disk.

Log markers are utilized to facilitate log replay. Records are typically organized in the log as pages, with typical sizes of a record being 100 bytes (B), a page being 4 KB and the log file being 400 MB. Within each page is a log marker that indicates how much of the log would need to be replayed (either undone or redone) if there was a crash and recovery at this point in time. In the event of a crash, the log marker instructs the storage system (or a log replay system executing therein) to replay only the pages indicated by the marker. As used herein, the term log replay system shall be taken to mean a module of the storage operating system adapted to perform log replay operations. The log replay system may also, in certain embodiments, process write operations to the log file. In alternate embodiments, the log replay system is separate from the portion of the storage operating system that writes to the log file. Upon completing the replay of the log, the log replay system inserts a log rollup record that indicates completion of the log replay up to the record. Thus, the rollup record is a placeholder that specifies to log replay system how many records have been replayed (i.e., the records up to the log rollup record).

A noted disadvantage of transaction-based logging (or journal) file systems is the amount of time required to replay the log following a crash and recovery. As data is typically not available to clients during log replay, it is desirable for storage systems to replay the log quickly (e.g., <1 minute) and commit the data to disk. As a result, log replay system typically performs "asynchronous writing" of dirty data to disk (i.e., waits for the dirty data to accumulate before writing it to disk). In order to avoid losing that modified data, the log replay system then "flushes the entire cache", i.e., that data from the storage system's cache at the end of the log replay. Flushing of such large amounts of dirty data (e.g., up to 400 MB) consumes a large amount of time and adversely affects system performance.

SUMMARY OF THE INVENTION

The present invention overcomes the disadvantages of the prior art by providing a technique for replaying a file system log file with partial flushing of a cache in a storage system to enable clients to obtain access to their data in a more expedient manner. The novel technique distinguishes between "redo" transactions and "undo" transactions and replays these transactions in multiple phases, a (i) a pre-processing phase, (ii) a redo phase, and (iii) an undo phase. The pre-processing phase performs various integrity checks and determines which portions of the log need to be replayed. The redo phase replays those transactions that were committed to the log prior to the crash. The undo phase rolls back those transactions that were not yet committed at the time of the crash.

Once the undo phase has completed, only the data dirtied during the undo phase is flushed from the cache to disk. If a transaction was undone during the undo phase, the technique writes any data that was modified to disk during the undoing of the transaction. As very few transactions are typically pending at the time of the crash, this partial cache flush can be performed quickly. Once the partial cache flush has occurred, a rollup record is written to the log file indicating which records were replayed. At this point, any transactions that were redone are stored in the storage system's cache, which may be written to disk using the storage system's conventional write allocation process.

If an additional crash occurs soon after finishing the undo phase cache flush, it is possible that the rollup record may not have been written to the log file. In such a case it is further possible that transactions prior to the rollup record may have to be replayed. To avoid having to replay the entire log, the novel technique utilizes the log markers to calculate the oldest (last) page committed to disk. To be able to insert (write) the appropriate log markers into the log, a list of data that was dirtied at various points and/or locations in the log is needed. In accordance with the illustrative embodiment, a log replay system executing in the storage system maintains a dirty data list during log replay.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
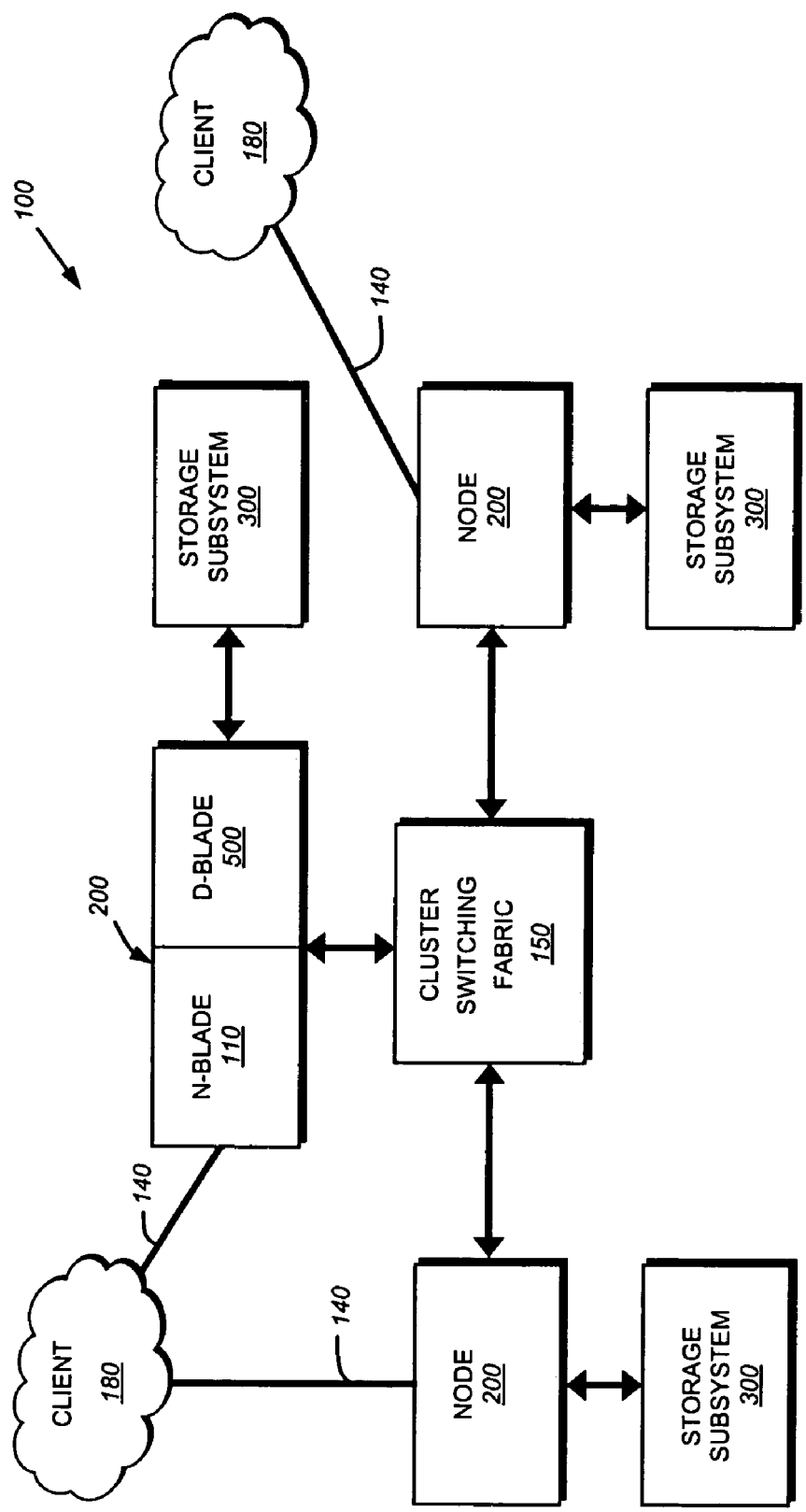
FIG. 1 is a schematic block diagram of a plurality of nodes interconnected as a cluster that may be advantageously used with the present invention.

FIG. 1 is a schematic block diagram of a plurality of nodes 200 interconnected as a cluster 100 and configured to provide storage service relating to the organization of information on storage devices of a storage subsystem. The nodes 200 comprise various functional components that cooperate to provide a distributed Spin File System (SpinFS) architecture of the cluster 100. To that end, each SpinFS node 200 is generally organized as a network element (N-blade 110) and a disk element (D-blade 500). The N-blade 110 includes a plurality of ports that couple the node 200 to clients 180 over a computer network 140, while each D-blade 500 includes a plurality of ports that connect the node to a storage subsystem 300. The nodes 200 are interconnected by a cluster switching fabric 150 which, in the illustrative embodiment, may be embodied as a Gigabit Ethernet switch. The distributed SpinFS architecture is generally described in U.S. Patent Application Publication No. US 2002/0116593 titled Method and System for Responding to File System Requests, by M. Kazar et al. published Aug. 22, 2002.

B. Storage Systems

Figure 2:
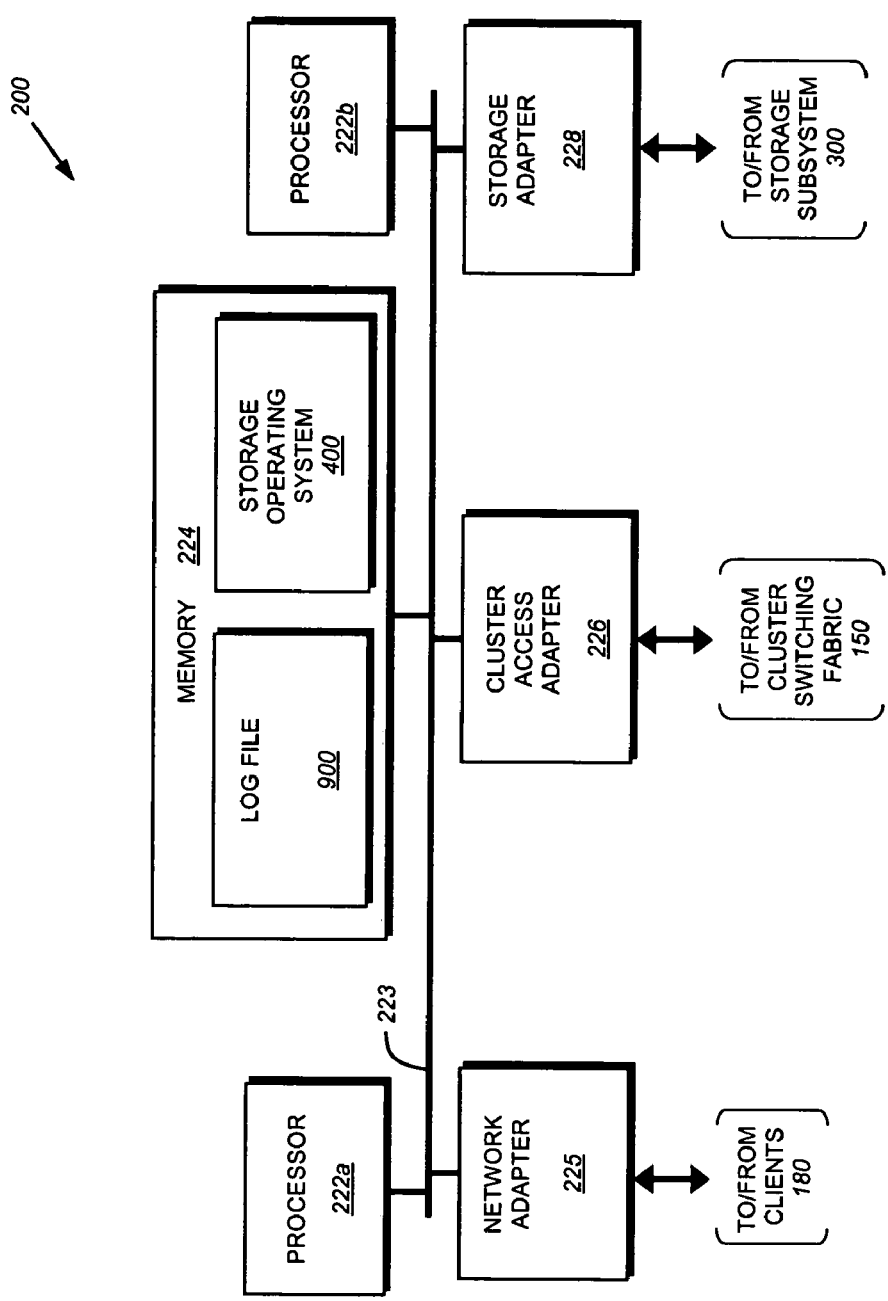
FIG. 2 is a schematic block diagram of a node that may be advantageously used with the present invention.

FIG. 2 is a schematic block diagram of a node 200 that is illustratively embodied as a storage system server comprising a plurality of processors 222, a memory 224, a network adapter 225, a cluster access adapter 226, a local storage and a storage adapter 228 interconnected by a system bus 223. The local storage is utilized by the node to store local configuration information (i.e. management data), including its local copy of a replicated database (RDB) 850 (see FIG. 8). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein.

Each node 200 is illustratively embodied as a dual processor server system executing a storage operating system 400 that provides a file system configured to logically organize the information as a hierarchical structure of named directories and files on storage subsystem 300. However, it will be apparent to those of ordinary skill in the art that the node 200 may alternatively comprise a single or more than two processor system. Illustratively, one processor 222a executes the functions of the N-blade 110 on the node, while the other processor 222b executes the functions of the D-blade 500. It should be noted that a node may comprise any number of N and D-blades. As such, the description of a node having one N-blade and one D-blade should be taken as exemplary only.

In the illustrative embodiment, the memory 224 comprises storage locations that are addressable by the processors and adapters for storing software program code and data structures, such as log file 900, associated with the present invention. The processor and adapters may, in turn, comprise processing elements and/or logic circuitry configured to execute the software code and manipulate the data structures. The storage operating system 400, portions of which are typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the inventive system and method described herein.

The network adapter 225 comprises a plurality of ports adapted to couple the node 200 to one or more clients 180 over point-to-point links, wide area networks, virtual private networks implemented over a public network (Internet) or a shared local area network, hereinafter referred to as an Ethernet computer network 140. Therefore, the network adapter 225 may comprise a network interface card (NIC) having the mechanical, electrical and signaling circuitry needed to connect the node to the network. For such a network attached storage (NAS) based network environment, the clients are configured to access information stored on the node 200 as files. The clients 180 communicate with each node over network 140 by exchanging discrete frames or packets of data according to pre-defined protocols, such as the Transmission Control Protocol/Internet Protocol (TCP/IP).

The storage adapter 228 cooperates with the storage operating system 400 executing on the node 200 to access information requested by the clients. The information may be stored on disks or other similar media adapted to store information. The storage adapter comprises a plurality of ports having input/output (I/O) interface circuitry that couples to the disks over an I/O interconnect arrangement, such as a conventional high-performance, Fibre Channel (FC) link topology. The information is retrieved by the storage adapter and, if necessary, processed by the processor 222 (or the adapter 228 itself) prior to being forwarded over the system bus 223 to the network adapter 225 where the information is formatted into packets or messages and returned to the clients.

Figure 3:
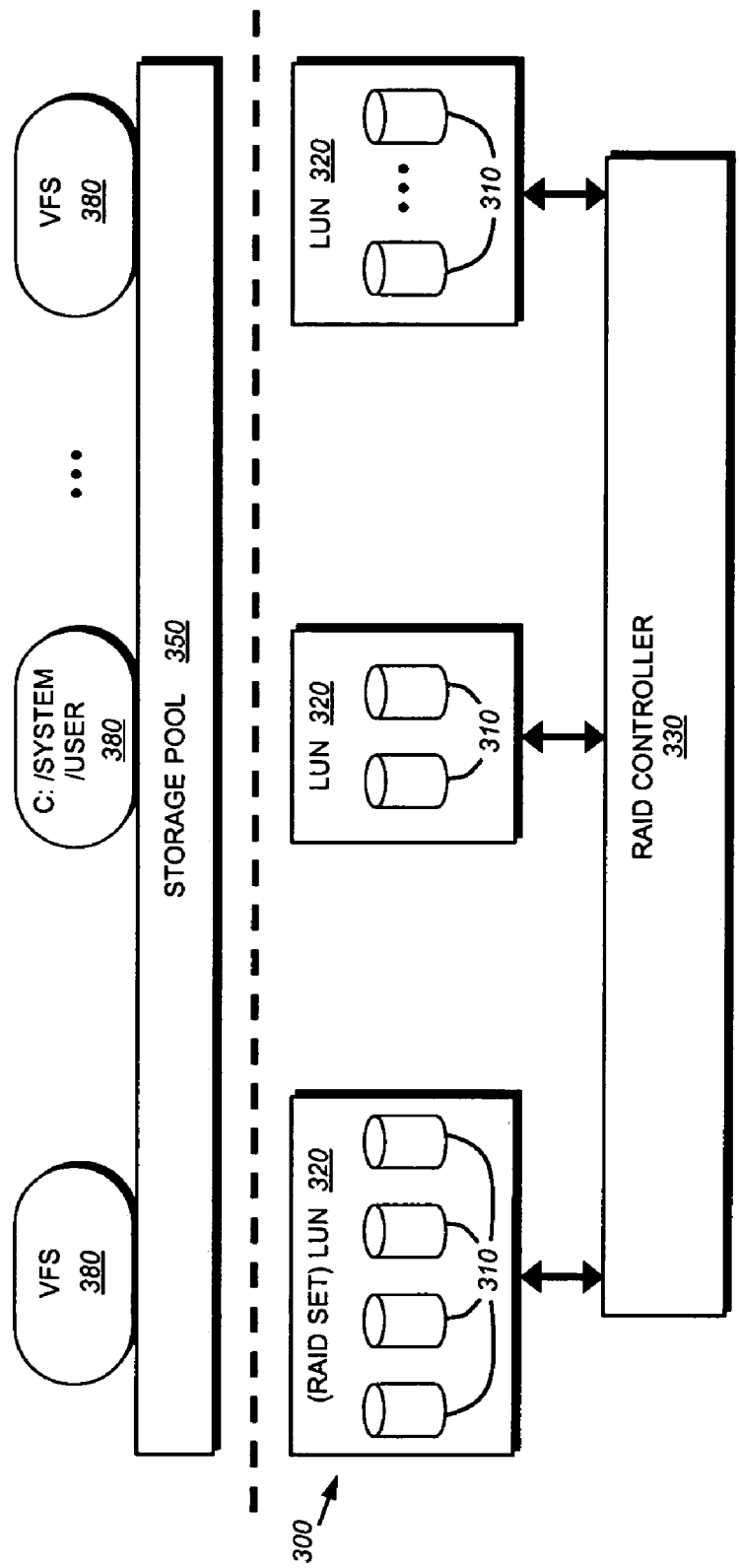
FIG. 3 is a schematic block diagram illustrating the storage subsystem that may be advantageously used with the present invention.

FIG. 3 is a schematic block diagram illustrating the storage subsystem 300 that may be advantageously used with the present invention. Storage of information on the storage subsystem 300 is illustratively implemented as a plurality of storage disks 310 defining an overall logical arrangement of disk space. The disks are further organized as one or more groups or sets of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may used in accordance with the present invention.

Each RAID set is illustratively configured by one or more RAID controllers 330. The RAID controller 330 exports a RAID set as a logical unit number (LUN 320) to the D-blade 500, which writes and reads blocks to and from the LUN 320. One or more LUNs are illustratively organized as a storage pool 350, wherein each storage pool 350 is "owned" by a D-blade 500 in the cluster 100. Each storage pool 350 is further organized as a plurality of virtual file systems (VFSs 380), each of which is also owned by the D-blade. Each VFS 380 may be organized within the storage pool according to a hierarchical policy that, among other things, allows the VFS to be dynamically moved among nodes of the cluster to, for example, control load among individual storage pools.

In the illustrative embodiment, a VFS 380 is synonymous with a volume and comprises a root directory, as well as a number of subdirectories and files. A group of VFSs may be composed into a larger namespace. For example, a root directory (c:) may be contained within a root VFS ("/"), which is the VFS that begins a translation process from a pathname associated with an incoming request to actual data (file) in a file system, such as the SpinFS file system. The root VFS may contain a directory ("system") or a mount point ("user"). A mount point is a SpinFS object used to "vector off" to another VFS and which contains the name of that vectored VFS. The file system may comprise one or more VFSs that are "stitched together" by mount point objects.

C. Storage Operating System

To facilitate access to the disks 310 and information stored thereon, the storage operating system 400 implements a write-anywhere file system, such as the SpinFS file system, which logically organizes the information as a hierarchical structure of named directories and files on the disks. However, it is expressly contemplated that any appropriate storage operating system, including a write in-place file system, may be enhanced for use in accordance with the inventive principles described herein. Each "on-disk" file may be implemented as set of disk blocks configured to store information, such as data, whereas the directory may be implemented as a specially formatted file in which names and links to other files and directories are stored.

As used herein, the term "storage operating system" generally refers to the computer-executable code operable on a computer that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 4:
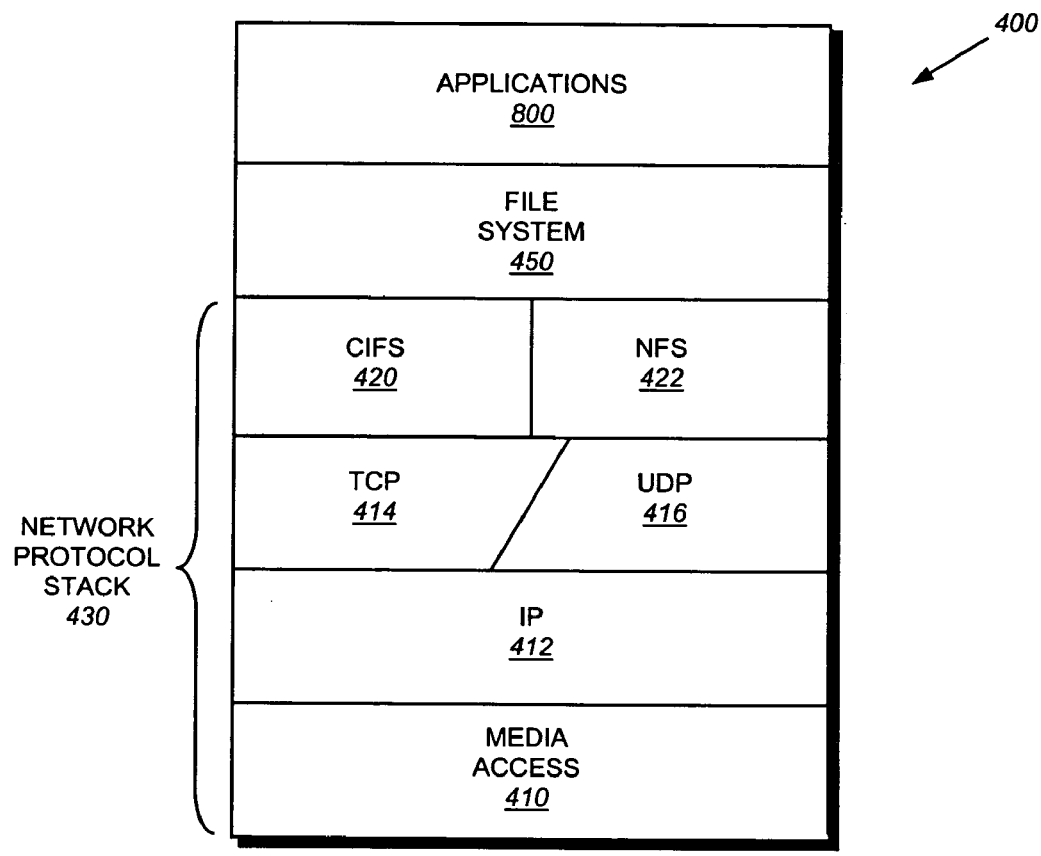
FIG. 4 is a partial schematic block diagram of a storage operating system that may be advantageously used with the present invention.

FIG. 4 is a partial schematic block diagram of the storage operating system 400 that may be advantageously used with the present invention. The storage operating system comprises a series of software layers organized to form an integrated network protocol stack 430 that provides a data path for clients to access information stored on the node 200 using file access protocols. The protocol stack includes a media access layer 410 of network drivers (e.g., gigabit Ethernet drivers) that interfaces to network protocol layers, such as the IP layer 412 and its supporting transport mechanisms, the TCP layer 414 and the User Datagram Protocol (UDP) layer 416. A file system protocol layer provides multi-protocol file access to a file system 450 (the SpinFS file system) and, thus, includes support for the CIFS protocol 420 and the NFS protocol 422. As described further herein, a plurality of management processes executes as user mode applications 800.

In the illustrative embodiment, the processors 222 share various resources of the node 200, including the storage operating system 400. To that end, the N-blade 110 executes the integrated network protocol stack 430 of the operating system 400 to thereby perform protocol termination with respect to a client issuing incoming NFS/CIFS file access request packets over the network 150. The NFS/CIFS layers of the network protocol stack function as NFS/CIFS servers 422, 420 that translate NFS/CIFS requests from a client into SpinFS protocol requests used for communication with the D-blade 500. The SpinFS protocol is a file system protocol that provides operations related to those operations contained within the incoming file access packets. Local communication between an N-blade and D-blade of a node is preferably effected through the use of message passing between the blades, while remote communication between an N-blade and D-blade of different nodes occurs over the cluster switching fabric 150.

D. D-Blade

Figure 5:
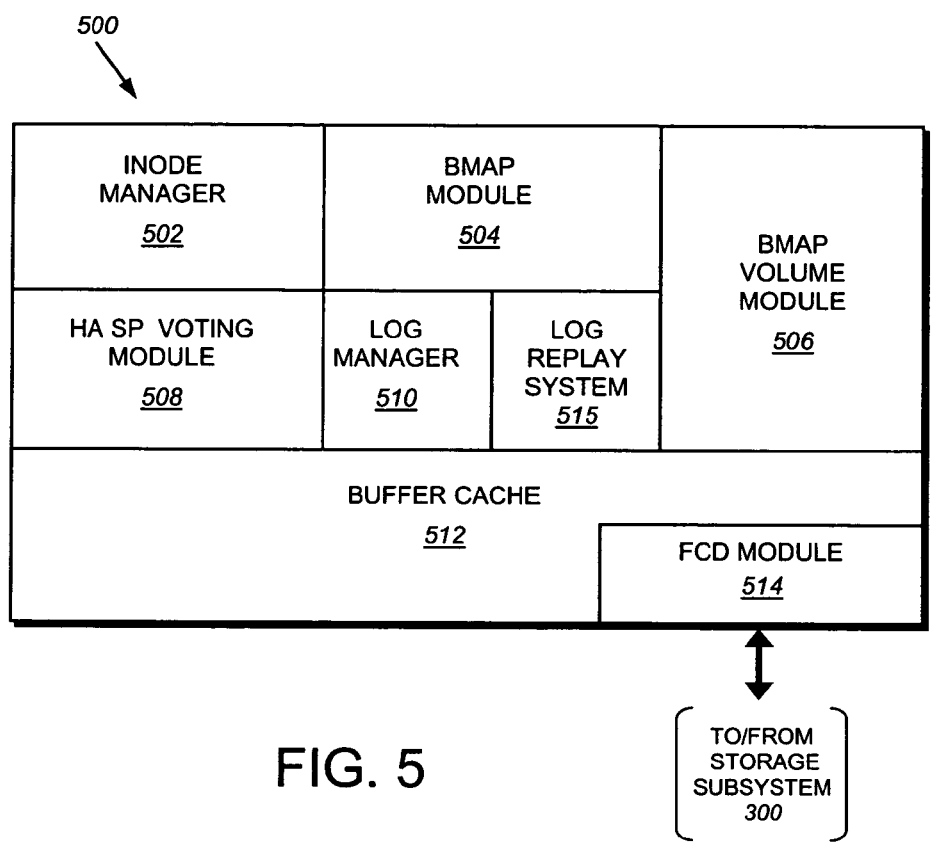
FIG. 5 is a schematic block diagram of a D-blade that may be advantageously used with the present invention.

Specifically, the NFS and CIFS servers of an N-blade 110 convert the incoming file access requests into SpinFS requests that are processed by the D-blades 500 of the cluster 100. Each D-blade 500 provides a disk interface function through execution of the SpinFS file system 450. In the illustrative cluster 100, the file systems 450 cooperate to provide a single SpinFS file system image across all of the D-blades in the cluster. Thus, any network port of an N-blade that receives a client request can access any file within the single file system image located on any D-blade 500 of the cluster. FIG. 5 is a schematic block diagram of the D-blade 500 comprising a plurality of functional components including a file system processing module (the inode manager 502), a logical-oriented block processing module (the Bmap module 504) and a Bmap volume module 506. The inode manager 502 is the processing module that implements the SpinFS file system 450, whereas the Bmap module 504 is responsible for all block allocation functions associated with a write anywhere policy of the file system 450, including reading and writing all data to and from the RAID controller 330 of storage subsystem 300. The Bmap volume module 506, on the other hand, implements all VFS operations in the cluster 100, including creating and deleting a VFS, mounting and unmounting a VFS in the cluster, moving a VFS, as well as cloning (snapshotting) and mirroring a VFS. The D-blade also includes a high availability storage pool (HA SP) voting module 508, a log module (manager) 510, a buffer cache 512 and a fiber channel device driver (FCD) module 514.

The log manager 510 handles processing of write operations directed to the log file 900. The log replay system 515 processes associated recovery operations, including implementing the teachings of the present invention. The log replay system 515 illustratively performs a replay operation every time communication is established with a storage pool 350. Thus, log replay may occur as a result of a crash and recovery or as a result of an administrator initiated action, such as adding a storage pool to a cluster. It should be noted that in the illustrative embodiment, the log manager 510 and log replay system 515 are separate modules. It should be note that in alternate embodiments, the functions of the two modules may be combined in a single module.

E. SpinFS

Figure 6:
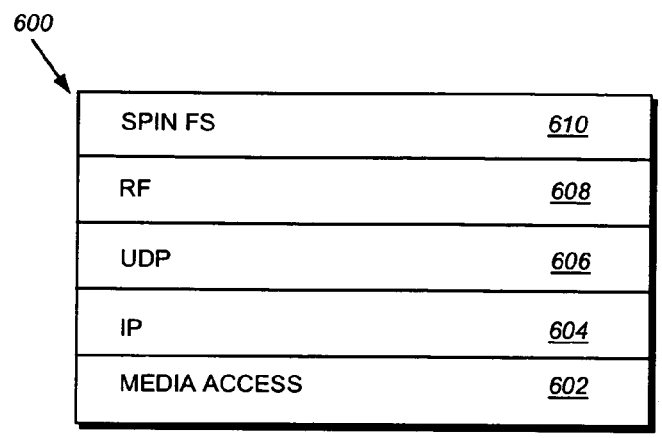
FIG. 6 is a schematic block diagram illustrating the format of a SpinFS request that may be advantageously used with the present invention.

The NFS and CIFS servers on the N-blade 110 translate respective NFS and CIFS requests into SpinFS primitive operations contained within SpinFS packets (requests). FIG. 6 is a schematic block diagram illustrating the format of a SpinFS request 600 that illustratively includes a media access layer 602, an IP layer 604, a UDP layer 606, an RF layer 608 and a SpinFS protocol layer 610. As noted, the SpinFS protocol 610 is a file system protocol that provides operations, related to those operations contained within incoming file access packets, to access files stored on the cluster 100. Illustratively, the SpinFS protocol 610 is datagram based and, as such, involves transmission of packets or "envelopes" in a reliable manner from a source (e.g., an N-blade) to a destination (e.g., a D-blade). The RF layer 608 implements a reliable transport protocol that is adapted to process such envelopes in accordance with a connectionless protocol, such as UDP 606.

Figure 7:
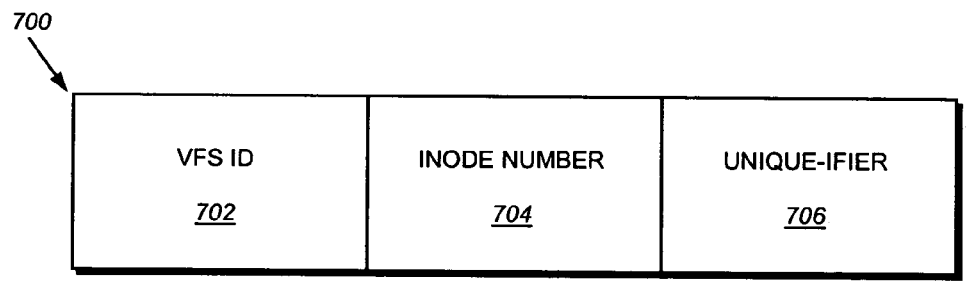
FIG. 7 is a schematic block diagram illustrating the format of a file handle that may be advantageously used with the present invention.

Files are accessed in the SpinFS file system 450 using a file handle. FIG. 7 is a schematic block diagram illustrating the format of a file handle 700 including a VFS ID field 702, an inode number field 704 and a unique-ifier field 706. The VFS ID field 702 contains an identifier of a VFS that is unique (global) within the entire cluster 100. The inode number field 704 contains an inode number of a particular inode within an inode file of a particular VFS. The unique-ifier field 706 contains a monotonically increasing number that uniquely identifies the file handle 700, particularly in the case where an inode number has been deleted, reused and reassigned to a new file. The unique-ifier distinguishes that reused inode number in a particular VFS from a potentially previous use of those fields.

Figure 8:
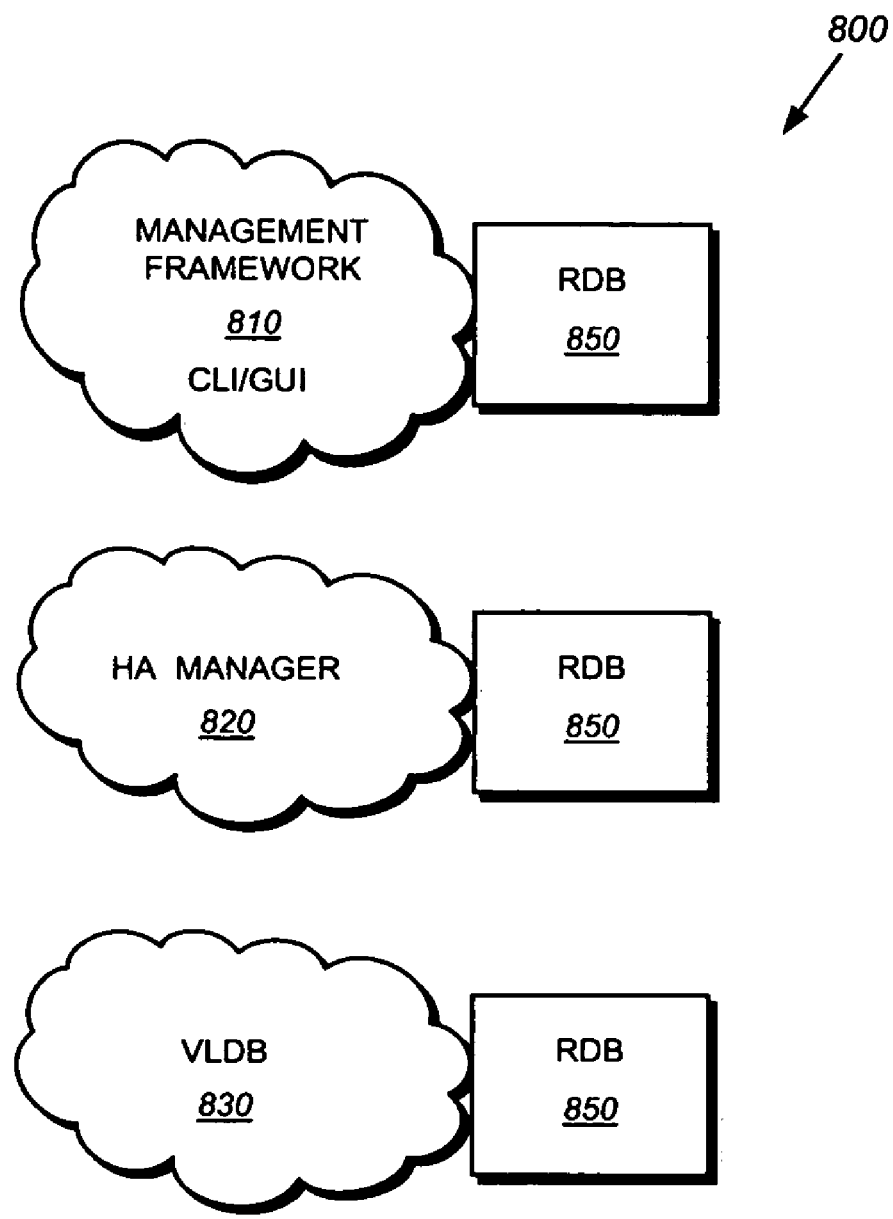
FIG. 8 is a schematic block diagram illustrating a collection of management processes that may be advantageously used with the present invention.

FIG. 8 is a schematic block diagram illustrating a collection of management processes that execute as user mode applications 800 on the storage operating system 400 to provide management of configuration information (i.e. management data) for the nodes of the cluster. To that end, the management processes include a management framework process 810, a high availability manager (HA Mgr) process 820, a VFS location database (VLDB) process 830 and a replicated database (RDB) process 850. The management framework 810 provides a user interface via a command line interface (CLI) and/or graphical user interface (GUI). The management framework is illustratively based on a conventional common interface model (CIM) object manager that provides the entity to which users/system administrators interact with a node 200 in order to manage the cluster 100.

The HA Mgr 820 manages all network addresses (IP addresses) of all nodes 200 on a cluster-wide basis. For example, assume a network adapter 225 having two IP addresses (IP1 and IP2) on a node fails. The HA Mgr 820 relocates those two IP addresses onto another N-blade of a node within the cluster to thereby enable clients to transparently survive the failure of an adapter (interface) on an N-blade 110. The relocation (repositioning) of IP addresses within the cluster is dependent upon configuration information provided by a system administrator. The HA Mgr 820 is also responsible for functions such as monitoring an uninterrupted power supply (UPS) and notifying the D-blade to write its data to persistent storage when a power supply issue arises within the cluster.

The VLDB 830 is a database process that tracks the locations of various storage components (e.g., a VFS) within the cluster 100 to thereby facilitate routing of requests throughout the cluster. In the illustrative embodiment, the N-blade 110 of each node has a look up table that maps the VFS ID 702 of a file handle 700 to a D-blade 500 that "lowns" (is running) the VFS 380 within the cluster. The VLDB provides the contents of the look up table by, among other things, keeping track of the locations of the VFSs 380 within the cluster. The VLDB has a remote procedure call (RPC) interface, e.g., a Sun RPC interface, which allows the N-blade 110 to query the VLDB 830. When encountering a VFS ID 702 that is not stored in its mapping table, the N-blade sends an RPC to the VLDB process. In response, the VLDB 830 returns to the N-blade the appropriate mapping information, including an identifier of the D-blade that owns the VFS. The N-blade caches the information in its look up table and uses the D-blade ID to forward the incoming request to the appropriate VFS 380.

All of these management processes have interfaces to (are closely coupled to) a replicated database (RDB) 850. The RDB comprises a library that provides a persistent object store (storing of objects) for the management data processed by the management processes. Notably, the RDB 850 replicates and synchronizes the management data object store access across all nodes 200 of the cluster 100 to thereby ensure that this RDB database is identical (has an identical image) on all of the nodes 200. For example, the HA Mgr 820 uses the RDB library 850 to monitor the status of the IP addresses within the cluster. At system startup, each node 200 records the status/state of its interfaces and IP addresses (those IP addresses it "owns") into the RDB database.

Operationally, requests are issued by clients 180 and received at the network protocol stack 430 of an N-blade 110 within a node 200 of the cluster 100. The request is parsed through the network protocol stack to the appropriate NFS/CIFS server, where the specified VFS 380 (and file), along with the appropriate D-blade 500 that "owns" that VFS, are determined. The appropriate server then translates the incoming request into a SpinFS request 600 that is routed to the D-blade 500. The D-blade receives the SpinFS request and apportions it into a part that is relevant to the requested file (for use by the inode manager 502), as well as a part that is relevant to specific access (read/write) allocation with respect to blocks on the disk (for use by the Bmap module 504). All functions and interactions between the N-blade 110 and D-blade 500 are coordinated on a cluster-wide basis through the collection of management processes and the RDB library user mode applications 800.

F. Log Replay Without Total Cache Flush

The present invention provides a technique for replaying a file system log with partial flushing of the cache to enable clients to obtain access to their data in a more expedient manner. As clients cannot typically access data during a log replay operation, by accelerating the log replay, the "blackout" period for clients is shortened. The novel technique distinguishes between "redo" transactions and "undo" transactions and replays these transactions in multiple phases, a (i) a pre-processing phase, (ii) a redo phase, and (iii) an undo phase. The pre-processing phase performs various integrity checks and determines which portions of the log need to be replayed. The redo phase replays those transactions that were committed to the log file. The undo phase undoes those transactions that were not yet committed to the log file.

Once the undo phase has completed, only the data dirtied during the undo phase is flushed from the cache to disk. If a transaction was undone during the undo phase, the technique writes any data that was modified to disk during the undoing of the transaction. As very few transactions are typically pending at the time of the crash, this partial cache flush can be performed quickly. Once the partial cache flush has occurred, a rollup record is written to the log file indicating which records were replayed. At this point, any transactions that were redone are stored in the storage system's cache, which may be written to disk using the storage system's conventional write allocation process.

Figure 9:
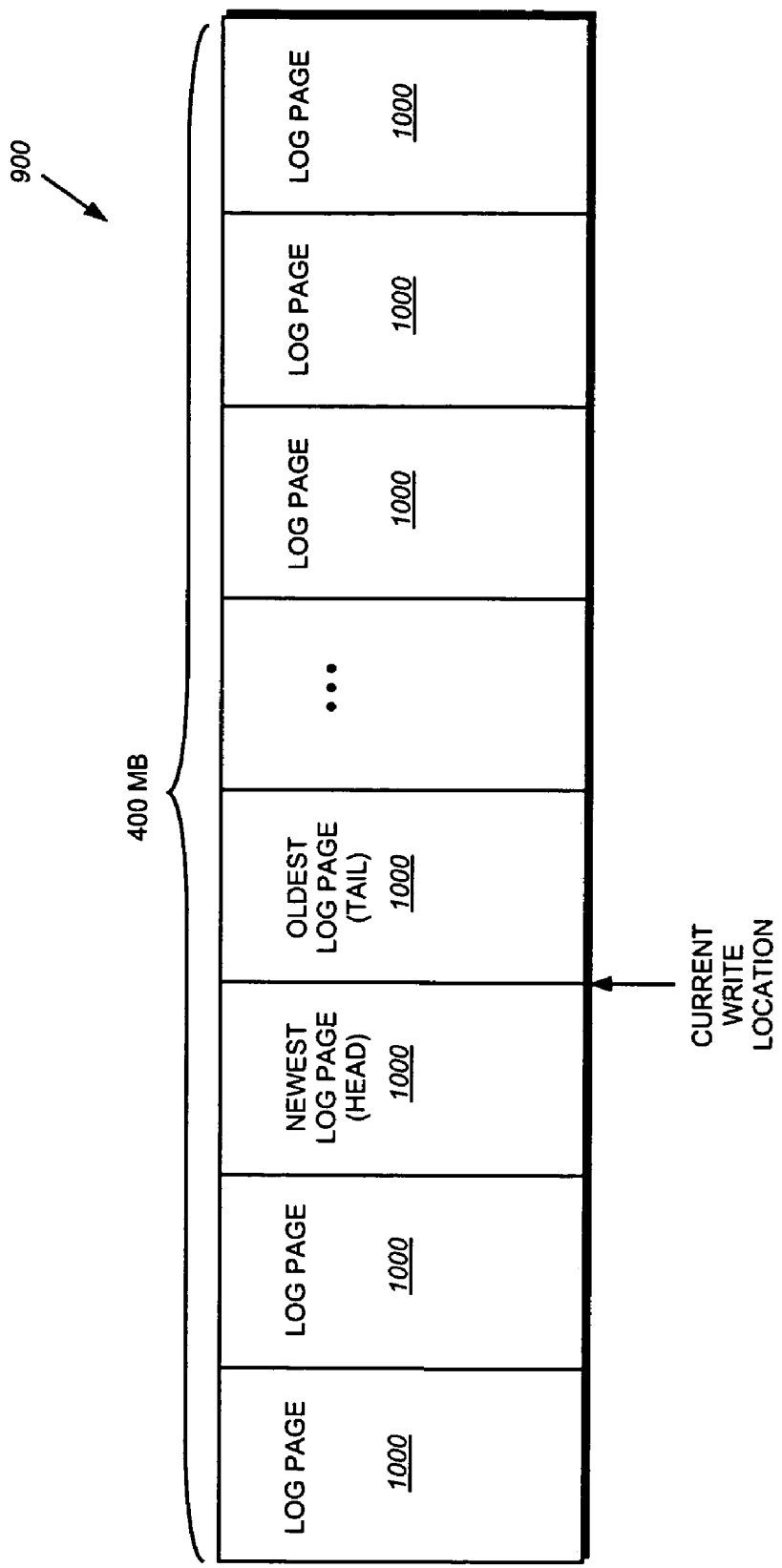
FIG. 9 is a schematic block diagram of an exemplary log file in accordance with an embodiment of the present invention.

FIG. 9 is a schematic block diagram of an exemplary log file 900 in accordance with an embodiment of the invention. The log file 900 is typically on the order of hundreds of megabytes (e.g., 400 MB) in size. The log file 900 is comprises of a number of log pages 1000. The log file is illustratively "circular" in that data wraps around the end of the file. Thus, the newest page (the head of the log file) is immediately adjacent to the oldest page (the tail of the log file). The head and tail of the log file move as new records are written to the log file.

Figure 10:
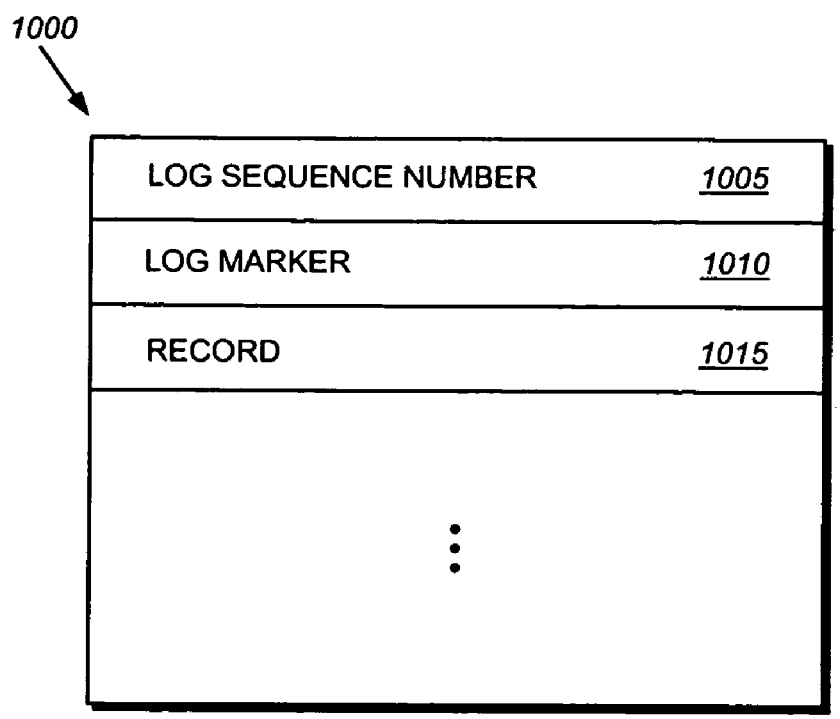
FIG. 10 is a schematic block diagram of an exemplary log page in accordance with an embodiment of the present invention.

FIG. 10 is a schematic block diagram of an exemplary log page 1000 in accordance with an embodiment of the invention. Each log page illustratively includes a log sequence number field 1005, a log marker field 1010 and one or more records 1100. The log sequence number field 1005 identifies where in the write sequence this page was most recently written. For example, assume that the log file is 400 MB in size. Then, the log sequence number of the first page in the log file is zero the first time it is written. Once the log "wraps around" and the first page in the log file is overwritten, the log sequence number would be 419,430,400 (i.e., 400 MB). The log replay system may utilize the log sequence numbers to identify how the log file is laid out during replay. For example, if the pages in the first 100 MB of the log have log sequence numbers from 400M-500M (wherein M equals 1024×1024) and pages in the remaining 300 MB have log sequence numbers from 100 M-400 M. Thus, in this example, the first 100 MB of the log has been overwritten by the log file.

The log marker field 1010 identifies a log sequence number of a page that is the start of the log file that needs to be replayed in the even of a crash. Using the example from above where the first 100 MB of the log file has log sequence numbers 400M-500M and the remaining 300 MB has sequence numbers from 100M-400M, assume the page with the highest log sequence number (i.e. log sequence number 500M) has a log marker that indicates a log sequence number of 250M. During replay, the log replay system will undo/redo operations from log sequence number 250M onwards.

Figure 11:
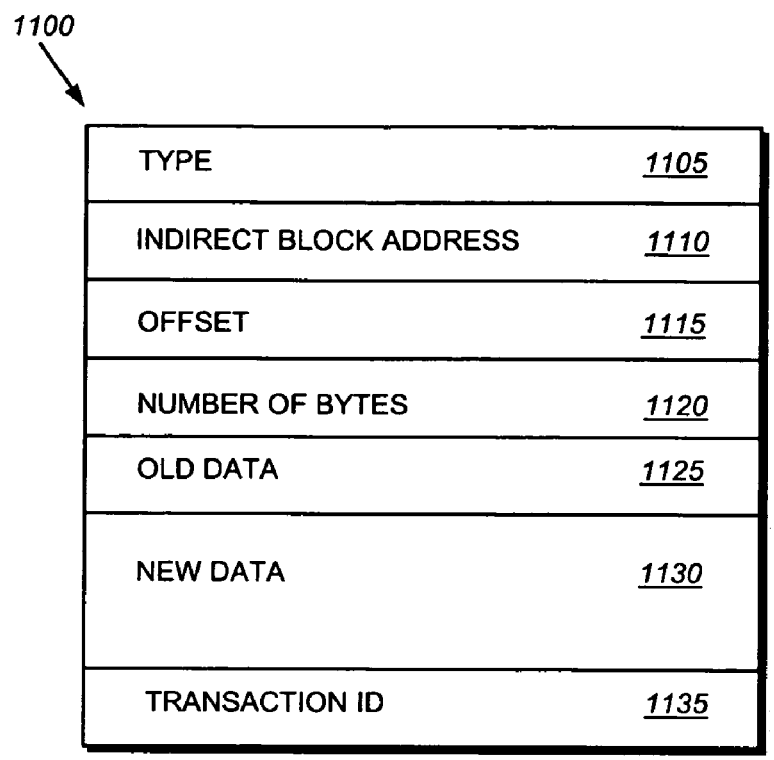
FIG. 11 is a schematic block diagram of an exemplary log record in accordance with an embodiment of the present invention.

FIG. 11 is a schematic block diagram of an exemplary record 1100 in accordance with an embodiment of the present invention. The record includes a type field 1105, an indirect block address field 1110, an offset field 1115, a number of bytes field 1120, an old data field 1125, a new data field 1030 and a transaction ID field 1135. In alternate embodiments, additional and/or differing fields may be included. The type field 1105 identifies the type of record. The indirect block address field 1110 identifies the indirect block being modified by the operation represented by the record, while the offset field 1115 identifies the offset within the indirect block. The number of bytes field 1120 identifies the number of bytes of data in the old and new data fields 1125, 1130. The old data field 1125 contains the data that existed in the location identified by the indirect block address field 1110 and offset field 1115 before the transaction resulting in this record. The new data field 1130 contains the current data stored in that location. The transaction ID field 1135 contains a monotonically increasing value. The log replay system 515 utilizes the transaction IDs to determine which records are associated with a particular transaction.

Figure 12:
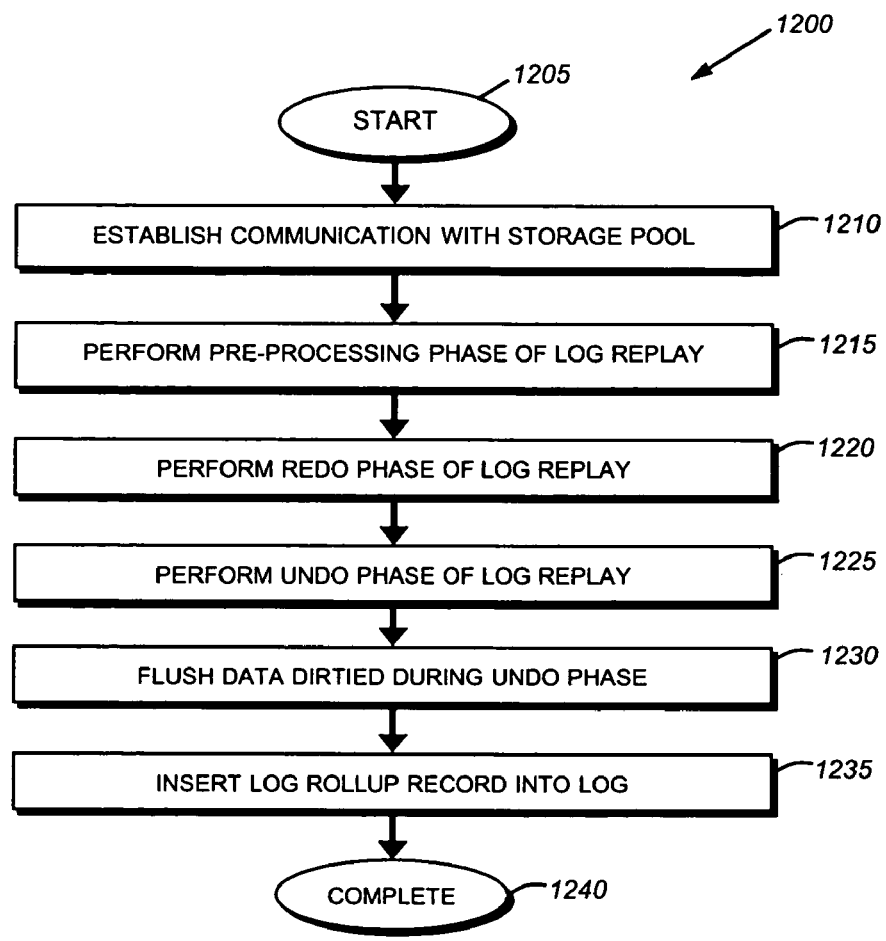
FIG. 12 is a flowchart of the steps of a procedure for log replay in accordance with an embodiment of the present invention.

In response to establishing communication with a storage pool 350, log replay system 515 performs a log replay procedure. FIG. 12 is a flowchart detailing the steps of an illustrative log replay procedure 1200. The procedure 1200 begins in step 1205 and continues to step 1210 where the node 200 (re)-establishes communication with the storage pool. This may result from the node crashing and reinitializing or due to an administrator-initiated action, such as adding the storage pool to a node. In response to the establishment of communication with the storage pool, the procedure continues to step 1215 where a pre-processing phase of log replay is performed. During the pre-processing phase, the log replay system 515 identifies the appropriate sections of the log file 900 to be replayed by, e.g., examining the log markers 1010 embedded in the log file.

Once the appropriate portions of the log file have been identified, the procedure continues to step 1220 where the redo phase of log replay is performed. During this phase, the log replay system replays any transactions that need to be redone, i.e., those operations that were committed to the log file. During the redo phase of log replay, the log replay system maintains a list of data dirtied during the replay operation to thereby allow subsequent insertion of appropriate log markers into the log file.

Then, in step 1225, the log replay system performs the undo phase of log replay. During the undo phase, all transactions that were pending at the time of the crash, i.e., those transactions that were not committed to the log file, are undone. Undoing a transaction is typically accomplished by replacing the data stored at the location identified by fields 1110 and 1115 with the data stored in the old data field 1125. After the undo phase is complete, all data that was dirtied by the undo phase is flushed from the cache (e.g., buffer cache 512) in step 1230. As only a small amount of data needs to be flushed from the cache, this flushing operation does not require a substantial amount of time to complete. Once the flush operation is complete, the log replay system inserts a log rollup record into the log 900 in step 1235 before completing in step 1240. The log rollup record indicates that log replay has been completed up to the record.

Thus, in accordance with the illustrative embodiment, only the data dirtied during the undo phase is flushed from the cache 512 to disk, which may be accomplished quickly. Data that is dirtied during the redo phase remains in the cache and will be flushed to disk using the node's conventional write allocation process.

While there has been shown and described an embodiment of a technique for replaying a file system log file with partial flushing of a cache in a storage system, it is to be understood that various other adaptations and modifications may be made within the spirit and scope of the present invention. For example, if an additional crash occurs soon after finishing the undo phase cache flush, it is possible that the rollup record may not have been written to the log file 900. In such a case it is further possible that transactions prior to the rollup record may have to be replayed. To avoid having to replay the entire log, the novel technique utilizes the log markers 1010 to calculate the oldest (last) page committed to disk.

To again summarize, the present invention provides a technique for accelerating log replay by only partially flushing the cache after performing a replay procedure. In the illustrative embodiment, the appropriate portions of the log are identified and those entries that are to be redone are replayed followed by those entries that are to be undone. Only the undone transactions are flushed from the cache to disk. This typically does not require a significant amount of time as few transactions are pending at the time of a crash. Once the cache has been partially flushed, the dirtied data remaining in the cache from the log replay is written to disk using the node's conventional write allocation process.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-blades, the teachings of the present invention are equally suitable to systems where the functionality of the N and D-blades are implemented in a single system. Alternately, the functions of the N and D-blades may be distributed among any number of separate systems wherein each system performs one or more of the functions. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for replaying a log file of a storage system, comprising:

performing a pre-processing phase that determines that one or more transactions of the log file need to be replayed;

performing a redo phase wherein the one or more transactions that are determined to need to be replayed are redone, wherein the one or more transactions that need to be redone are transactions committed to the log file but occur after a last page of the log file that is committed to a storage device;

performing an undo phase wherein one or more transactions are undone, wherein the one or more transactions that are undone include transactions that were not yet committed to the log file; and flushing data dirtied during the undo phase from a cache of the storage system to a disk of the storage system, wherein the flushing of data dirtied during the undo phase represents a partial flush of the cache, thereby obviating a need to flush all data dirtied during replay of the log file.

2. The method of claim 1 further comprising maintaining a list of data dirtied during the redo phase.

3. The method of claim 1 further comprising writing a log rollup record to the log file.

4. The method of claim 1 wherein the one or more transactions that are redone modify data in the cache.

5. The method of claim 1 wherein the step of performing the redo phase further comprises:
examining log markers in the log file to determine the last page of the log file committed to the storage device.

6. A computer system for replaying a log file of a storage system in response to a crash and recovery sequence of the system, the system comprising:
means for performing a pre-processing phase that determines that one or more transactions of the log file need to be replayed;
means for performing a redo phase wherein the one or more transactions that are determined to need to be replayed are redone, wherein the one or more transactions that need to be redone are transactions committed to the log file but occur after a last page of the log file that is committed to a storage device;
means for performing an undo phase wherein one or more transactions are undone, wherein the one or more transactions that are undone include transactions that were not yet committed to the log file; and
means for flushing data dirtied during the undo phase from a cache of the storage system to a disk of the storage system, wherein the flushing of data dirtied during the undo phase represents a partial flush of the cache, thereby obviating a need to flush all data dirtied during replay of the log file.

7. The system of claim 6 further comprising means for maintaining a list of data dirtied during the redo phase.

8. The system of claim 6 further comprising means for writing a log rollup record to the log file.

9. The system of claim 6 wherein the one or more transactions that are redone comprise dirty data in the cache.

10. The system of claim 6 wherein the means for performing the redo phase further comprise:
means for examining log markers in the log file to determine the last page of the log file committed to the storage device.

11. A computer readable storage medium for replaying a log file of a filer in response to a crash and recovery sequence of the filer, the computer readable medium including program instructions for performing the steps of:
performing a pre-processing phase that determines that one or more transactions of the log file need to be replayed;
performing a redo phase wherein the one or more transactions that are determined to need to be replayed are redone, wherein the one or more transactions that need to be redone are transactions committed to the log file but occur after a last page of the log file that is committed to a storage device;
performing an undo phase wherein one or more transactions are undone, wherein the one or more transactions that are undone include transactions that were not yet committed to the log file; and
flushing data dirtied during the undo phase from a cache of the storage system to a disk of the storage system, wherein the flushing of data dirtied during the undo phase represents a partial flush of the cache, thereby obviating a need to flush all data dirtied during replay of the log file.

12. The computer readable medium of claim 11 further comprising program instructions for maintaining a list of data dirtied during the redo phase.

13. The computer readable medium of claim 11 further comprising program instructions for writing a log rollup record to the log file.

14. The computer readable medium of claim 11 wherein the one or more transactions that are redone modify data in the cache.

15. The computer readable medium of claim 11 wherein the step of performing the redo phase further comprises the steps of:
examining log markers in the log file to determine the last page of the log file committed to a storage device; and
redoing transactions that occur after the last page of the log file that is committed to the storage device.

16. A method for replaying a file system log, comprising:
recording, by a storage system, one or more transactions in a log file, the transactions including old and new values of data items;
identifying appropriate sections of a log file to be replayed;
redoing transactions that had been recorded to the log file to restore the new values of the data item, wherein the redoing transactions are transactions committed to the log file but occur after the last page of a log file that is committed to a storage device;
undoing transactions that had not been fully recorded to the log file to restore old values of the data item, wherein the undoing transactions include transactions that were not yet committed to the log file; and
flushing data that was modified during the undoing step from a cache to a disk of the storage system without flushing data modified during the redoing step.

17. The method of claim 16 further comprising:
recording log markers in the log file, the log markers indicating data to be replayed.

18. The method of claim 17 wherein the redoing step further comprises:
examining log markers in the log file to determine the last page of the log file committed to a storage device.

19. A method for operating a storage system comprising:
initiating a file system operation;
recording, by the storage system, one or more transactions of the file system operation in a log file, the transactions including directory and inode data relating to changes in the storage system occasioned by the file system operation;
detecting a system interruption which leaves a file system operation partially complete;
identifying appropriate sections of a log to be replayed;
redoing transactions that had been recorded to the log file to restore the new values of the data item, wherein the redoing transactions are transactions committed to the log file but occur after a last page of the log file that is committed to a storage device;
undoing transactions that had not been fully recorded to the log file to restore old values of the data item, wherein the undoing transactions include transactions that were not yet committed to the log file; and
flushing data that was modified during the undoing step from a cache to a disk of the storage system without flushing data modified during the redoing step.

20. A computer storage medium for operating a storage system, the computer readable medium including program instructions for performing the steps of:
recording, by the storage system, one or more transactions of a file system operation in a log file, the transactions including directory and inode data relating to changes in the storage system occasioned by the file system operation;
detecting a system interruption which leaves a file system operation partially complete;
identifying appropriate sections of a log to be replayed;

redoing transactions that had been recorded to the log file to restore the new values of the data item, wherein the redoing transactions are transactions committed to the log file but occur after a last page of the log file that is committed to a storage device;

undoing transactions that had not been fully recorded to the log file to restore old values of the data item, wherein the undoing transactions include transactions that were not yet committed to the log file; and flushing data that was modified during the undoing step from a cache to a disk without flushing data modified during the redoing step.

21. A method for replaying a log file of a storage system, comprising:

in response to a failure by the storage system, performing a pre-processing phase that determines that one or more transactions of the log file need to be replayed;

examining log markers in the log file to determine a last page of the log file committed to the storage device;

performing a redo phase wherein the one or more transactions that are determined to need to be replayed are redone, wherein the one or more transactions that need to be redone are transactions committed to the log file but occur after the last page of the log file that is committed to a storage device;

performing an undo phase wherein one or more transactions are undone, wherein the one or more transactions that are undone include transactions that were not yet committed to the log file; and flushing data dirtied during the undo phase from a cache to a disk of the storage system, wherein the flushing of data dirtied during the undo phase represents a partial flush of the cache, thereby obviating a need to flush all data dirtied during replay of the log file.

22. The method of claim 21, further comprising:
maintaining a list of data dirtied during the redo phase.

23. The method of claim 22 further comprising:
in response to completing the undo phase, determining an additional failure by the storage system;
utilizing the log markers to calculate the last page committed to the storage device.

24. The method of claim 23, wherein the log markers allow determination of the last page committed to disk when a log rollup record is not yet written to disk, where the log rollup record indicates completion of the log replay up to a record.

25. The method of claim 24, wherein the record is a sequence of bytes indicating the progress of an action.

26. The method of claim 21, further comprising:
writing a log rollup record to the log file.

27. The method of claim 21, wherein the one or more transactions that are redone modify data in the cache.

28. A method for operating a storage system, comprising:
maintaining a cache, the cache holding new data to be written to permanent storage;
maintaining a log file;
detecting a system interruption which leaves a file system operation partially complete;
performing a pre-processing phase to locate regions of the log file to replay;
performing a redo phase to locate all transactions committed in the log file;
performing an undo phase to locate all transactions not committed in the log file, and
flushing, from cache to disk, the transactions not committed in the log file, while not flushing the transactions committed in the log file.

29. The method of claim 28, further comprising:
maintaining a list of data dirtied during the redo phase.

30. The method of claim 28, further comprising:
writing a log rollup record to the log file.

31. The method of claim 28, further comprising:
modifying data in the cache for the one ore transactions that are redone.

32. The method of claim 28 wherein the step of performing the redo phase further comprises:
examining log markers in the log file to determine the last page of the log file committed to the storage device.

33. The method of claim 28, further comprising:
writing from cache to disk the transactions that committed to the log file using a conventional write allocation process.

34. A system for operating a storage system, comprising:
a cache holding new data to be written to permanent storage;
the operating storage system to maintain a log file;
a process to detect a system interruption which leaves a file system operation partially complete;
the process to perform a pre-processing phase to locate regions of the log file to replay;
the process to perform a redo phase to locate all transactions committed in the log file;
the process to perform an undo phase to locate all transactions not committed in the log file, and
the process to flush, from cache to disk, the transactions not committed in the log file, while not flushing the transactions committed in the log file.

35. The system of claim 34, further comprising:
the operating storage system to maintain a list of data dirtied during the redo phase.

36. The system of claim 34, further comprising:
the operating storage system to write a log rollup record to the log file.

37. The system of claim 34 wherein the one or more transactions that are redone modify data in the cache.

38. The system of claim 34 wherein the step of performing the redo phase further comprises:
the storage operating system to examine log markers in the log file to determine the last page of the log file committed to the storage device.

39. The system of claim 34 wherein the transactions that were committed to the log file are written from cache to disk using a conventional write allocation process.

40. A computer storage medium for operating a storage system, the computer readable medium including program instructions for performing the steps of:
maintaining a cache, the cache holding new data to be written to permanent storage;
maintaining a log file;
detecting a system interruption which leaves a file system operation partially complete;
performing a pre-processing phase to locate regions of the log file to replay;
performing a redo phase to locate all transactions committed in the log file;
performing an undo phase to locate all transactions not committed in the log file, and
flushing, from cache to disk, the transactions not committed in the log file, while not flushing the transactions committed in the log file.

* * * * *

UNITED STATES PATENT AND TRADEMARK OFFICE
CERTIFICATE OF CORRECTION

| | | |
|---|---|---|
| PATENT NO. | : 7,519,628 B1 | Page 1 of 1 |
| APPLICATION NO. | : 10/858169 | |
| DATED | : April 14, 2009 | |
| INVENTOR(S) | : Bruce W. Leverett | |

It is certified that error appears in the above-identified patent and that said Letters Patent is hereby corrected as shown below:

In Col. 13, line 40 should read:
        11. A computer ~~readable~~ storage medium for replaying a Signed and Sealed this
Twenty-second Day of May, 2012

David J. Kappos
*Director of the United States Patent and Trademark Office*